United States Patent [19]

Preis et al.

[11] 4,300,321
[45] Nov. 17, 1981

[54] COMPOSITE FIBRE MATERIAL ARTICLES WITH INLAYS AND A METHOD OF PRODUCING THEM

[75] Inventors: Lothar Preis, Bergisch Gladbach; Dieter Jehle, Leverkusen, both of Fed. Rep. of Germany

[73] Assignee: Bayer Aktiengesellschaft, Leverkusen, Fed. Rep. of Germany

[21] Appl. No.: 126,763

[22] Filed: Mar. 3, 1980

[30] Foreign Application Priority Data

Mar. 21, 1979 [DE] Fed. Rep. of Germany ....... 2910984

[51] Int. Cl.³ .......................... D02G 3/00; E04C 3/10; E04C 3/30
[52] U.S. Cl. .................... 52/223 R; 52/740; 428/375; 428/379; 428/397; 428/399
[58] Field of Search ............... 428/364, 373, 375, 376, 428/397, 399, 379, 369, 370, 290, 293, 294; 52/740, 223 R, 309.15

[56] References Cited

U.S. PATENT DOCUMENTS

| | | |
|---|---|---|
| 1,574,004 | 2/1926 | Ryden . |
| 1,811,416 | 6/1931 | Williams .................. 428/369 X |
| 3,490,224 | 1/1970 | Bourgeas . |
| 3,574,104 | 4/1971 | Medler ............................ 428/377 |
| 4,040,770 | 8/1977 | Carlson .......................... 428/294 |
| 4,119,748 | 10/1978 | Verbauwhede et al. ........... 428/290 |

Primary Examiner—Lorraine T. Kendell
Attorney, Agent, or Firm—Sprung, Felfe, Horn, Lynch & Kramer

[57] ABSTRACT

By fitting cores in unidirectionally reinforced composite fibre material articles, it is possible to utilize their high tensile strength in the fibre direction far more because they can be anchored better without special outlay. The cross-section of the cores have to change in the fibre direction and it is important that the fibres run in a clinging fashion on the core and that it is completely embedded therein. The composite fibre material articles provided with cores can be produced continuously. The central region of a glass fibre bundle widens in an impregnation bath, the core inlay is introduced into this region and the fibres are then pressed against the core.

10 Claims, 26 Drawing Figures

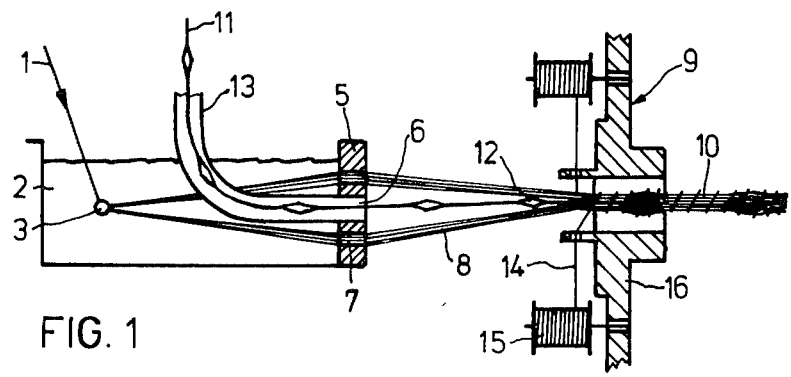
FIG. 1
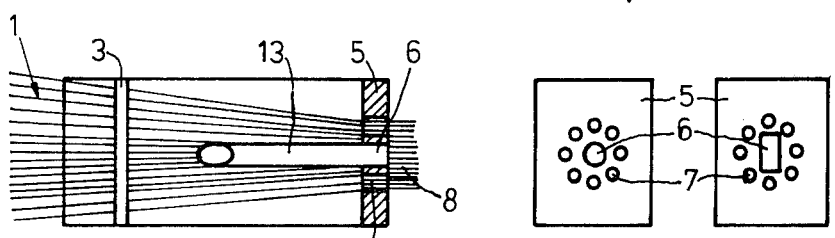
FIG. 2  FIG. 3  FIG. 4
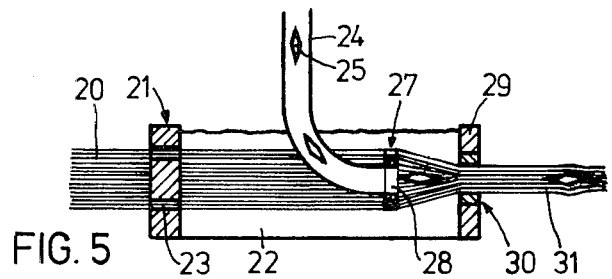
FIG. 5
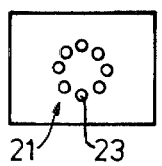  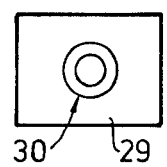
FIG. 6  FIG. 7  FIG. 8

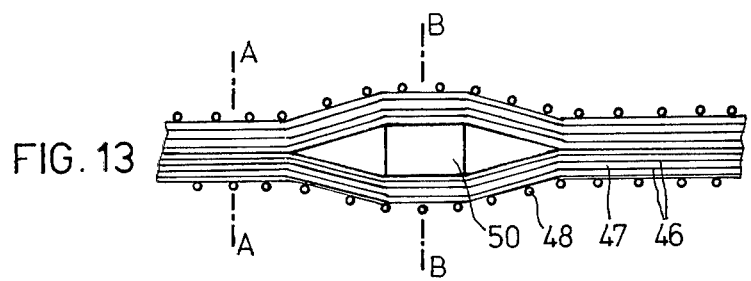
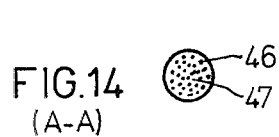 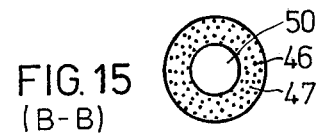
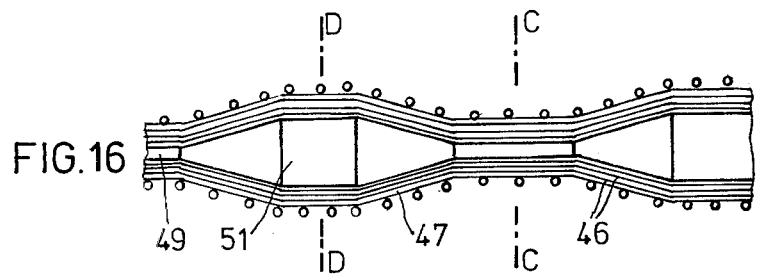
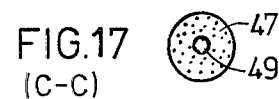 
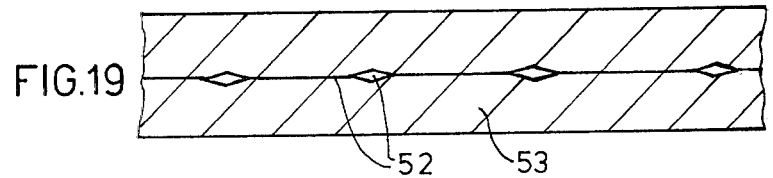

COMPOSITE FIBRE MATERIAL ARTICLES WITH INLAYS AND A METHOD OF PRODUCING THEM

BACKGROUND OF THE INVENTION

Composite fibre materials with unidirectional fibre orientation have become increasingly important in the last few years. They are of interest mainly due to their mechanical properties, in particular their high tensile strength, their good corrosion resistance and their low specific gravity. Unfortunately, it is generally possible to use only a fraction of their high strength because the anchoring of the composite material articles is difficult and expensive. It is not possible, for example, to introduce large forces in the composite fibre material over clamping connections, as is the case with steel. The same applies to bolt connections, screw connections and bonds. The introduction of force via closed fibre loops is very complicated and uneconomical and cannot be applied to continuously produced shaped sections.

It is known from German Offenlegungsschrift No. 2 705 438 that composite fibre materials can be anchored reliably and economically by embedding them in an anchor body composed of a binder whose properties of deformation and strength are adapted to those of the tension member which takes up the force from the tension member and conveys it to a fastening sleeve surrounding it and supporting it. A disadvantage of this type of anchoring is the relatively large length of the anchor body needed with high strength composite materials. Shorter anchoring lengths can be achieved if the anchor sleeve is designed in the shape of a cone or wedge and if an additional transverse pressure is produced in this way when a load is applied. However, this embodiment involves a higher outlay.

Unidirectionally fibre-reinforced composite materials are known in which cone or wedge shaped elements are introduced into a drilled or wedge shaped section. Precisely adapted fastening sleeves are needed for anchoring these shaped sections.

SUMMARY OF THE INVENTION

It has now been found that the anchoring of the shaped sections can be improved by a specially designed inlay. The invention relates to composite fibre material articles with predominantly unidirectional fibre orientation which are characterised in that an inlay is provided on which the fibres run clinging to a matrix, the cross-section of the inlay being changed in shape and/or size in the fibre direction.

Composite fibre material shaped sections in which the inlay is a thread-like core with thickened regions are particularly preferred. In many cases, the inaly need not be continuous and it preferably has periodic increases and reductions in cross-section. There can therefore be regions throughout where there is no inlay at all. It is of the upmost importance for the fibres to run in clinging fashion on the inlay or the core. The invention also relates to a method of producing the fibre-reinforced plastics shaped sections with an inlay.

Suitable core materials include, in particular, plastics, for example thermoplastic polymers, but also metals and mineral materials.

The cross-section of the cores should alter as continuously as possible in the fibre direction so that the path of the fibre is not subjected to any sudden changes in direction. The cross-section of the composite fibre material article and inlay have to be adapted to each other in such a way that the inlays are invariably completely embedded in the composite material. Inlays composed of materials which are susceptible to corrosion are thus permanently protected from the attack of corrosive media. Double cones and double wedges are preferred shapes for discrete cores.

To simplify production, the discrete inlays will preferably be introduced so as to be equidistant. However, it may also be necessary in some cases to introduce the cores only at predetermined points, for example in anchoring regions. It is also possible to line up the discrete elements of the inlay over a thread, in which process the distances between the core elements can be maintained very precisely. It is not necessary for all consecutive elements to be identical. They can vary in size and shape. Continuous core material whose cross-section thickens and becomes thinner is also suitable.

In theory, the composite fibre material articles according to the invention can be produced from any known reinforcing fibres, mixtures of reinforcing fibres as well as polymeric, metallic or ceramic matrix materials, glass-fibre-reinforced plastics (GFP) being typical.

Large forces can easily be introduced into the composite fibre materials according to the invention.

Whereas with known methods for anchoring composite fibre materials expensive anchor heads have to be moulded at the ends of the articles, or special designs for the fastening sleeve and the subsequent introduction of conical or wedge-shaped elements into the drilled or wedge shaped section are necessary, the composite fibre materials according to the invention can be anchored without difficulty and economically in fastening sleeves which are shaped to match the changes of cross-section and are known per se, and the strength of the composite materials can be utilised to a greater extent.

One or more core elements can be arranged in succession in the anchoring region, depending on the forces expected. The articles according to the invention are however also eminently suited for embedding over the entire length such as, for example, in the production of prestressed concrete by the pretensioning method. In this case, it is desirable for the core elements to be arranged regularly over the entire length of the composite material article.

According to the invention, it is possible to produce the composite fibre material articles, in particular the shaped sections, continuously. A method of producing rods of varying diameter from a combination of glass fibre strands and polyester resin is known wherein glass fibre yarns are impregnated with a synthetic resin and then drawn through an extrusion mould. The composite fibre material articles according to the invention cannot however be produced in this way. The composite fibre material articles according to the invention can be produced by widening the central region of the impregnated fibre bundle, introducing the inlay into this space and then pressing the fibres onto the inlay.

Embodiments of the invention are described in more detail in the following description with reference to the drawings.

BRIEF DESCRIPTION OF THE DRAWINGS

FIG. 1 shows a longitudinal section through an apparatus for producing shaped sections according to the invention.

FIG. 2 shows a plan view of the impregnation bath of an apparatus according to FIG. 1.

FIG. 3 shows the outlet opening of the impregnation bath for round shaped sections.

FIG. 4 shows the outlet opening of the impregnation bath for rectangular shaped sections.

FIG. 5 shows a longitudinal section through an apparatus having a flexible nozzle according to the invention.

FIG. 6 shows an inlet nozzle.

FIG. 7 shows a guide element on the core supply.

FIG. 8 shows a flexible nozzle.

FIG. 13 shows a rod formed by the apparatus of FIG. 5.

FIG. 14 is a cross-section along line A—A in FIG. 13.

FIG. 15 is a cross-section along line B—B in FIG. 13.

FIG. 16 is a rod formed by the apparatus of FIG. 1.

FIG. 17 is a cross section along line C—C in FIG. 16.

FIG. 18 is a cross-section along line D—D in FIG. 16.

FIG. 19 is a concrete member with one rod of the composite fiber material embedded therein.

DETAILED DESCRIPTION OF THE INVENTION

Figure 9A:
FIGS. 9a-f show examples of core elements.
Figure 9D:
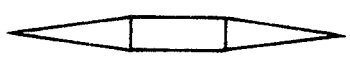
Figure 9B:
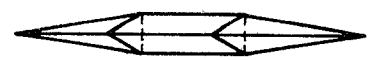
Figure 9E:
Figure 9C:
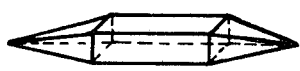
Figure 9F:

Continuous unidirectional glass-fibre-reinforced plastics shaped sections can be produced using an apparatus according to FIG. 1. The non-impregnated glass fibres or thread bundles 1 are taken off a thread delivery lattice and impregnated in an impregnating bath 2 with the matrix, an unsaturated polyester resin in this case. The glass threads 1 are guided over the deflecting pin 3 and issue from the impregnating bath 2 through nozzles 7 in the outlet plate 5. FIGS. 3 and 4 show two embodiments of the outlet plate 5 in a plan view. There is a round or rectangular opening 6 in the centre of the plate 5 depending on whether a rotationally symmetrical inlay or an inlay with a rectangular cross-section is to be introduced into the central region of the thread bundle. The glass threads 1 are drawn through a number of smaller nozzles 7 arranged round the central opening 6. These nozzles 7 are so narrow that excess resin is retained.

The impregnated glass fibre bundles are brought together in the winding apparatus 9 to form a round or rectangular shaped section. In FIG. 1, the inlay 11 consists of double cones 12 which are lined up on a thread and which is supplied via a duct 13. The composite material article is pressed together by means of a thread 14 which is run-off a rotating bobbin 15 by rotating a winding disc 16 to form a rod 10. One skilled in the art knows that other apparatuses which are not essential to the invention such as, for example, apparatuses for curing and for drawing have to be connected to the apparatus illustrated. It is not absolutely essential for the inlay to be added through the impregnation bath. It can also be supplied between the nozzles 7 and the winding apparatus 9 in which case the central opening 6 is obviously dispensed with.

FIG. 2 shows a plan view of the path of the thread in the region of the impregnation bath and FIGS. 3 and 4 show two embodiments of the outlet plate 5. The reference numerals are the same as in FIG. 1. The winding thread 14 contains the core 12 in such a way that the reinforcing fibres are uniformly distributed round the periphery and completely surround the core. The path of the fibre is adapted to the geometry of the core material. The fibres form a close bond with the core in the cured condition. Using this apparatus, it is possible to bring core material of changing cross-section as well as discrete core elements, which can also be coherent, into the central region of the widened fibre bundle 1. It may be beneficial to roughen the core material, to provide it with longitudinal grooves or with an adhesive for improved adhesion. It may also be advisable to heat the core material for improved wetting.

FIG. 5 shows another embodiment of an apparatus for carrying out the method according to the invention. In this arrangement, the threads 20 taken off a thread delivery lattice are introduced via an inlet nozzle 21 into the impregnation bath 22. In the production of round shaped sections, the nozzle 21 has approximately the shape illustrated in FIG. 6, of a ring of small bores 23, through which the glass fibre bundles have to be threaded. The individual elements 25 are introduced via tube 24. In this case also individual elements 25 have the shape of a double cone. The tube 24 ends with a guide ring 27. FIG. 7 shows a plan view of this ring 27. The inlay 25 passes through the central opening 28 between the glass fibre bundles. A single-stage flexible conically running nozzle 30 which combines the impregnated fibres to a strand 31 is located in a plate 29. The opening and closure of the flexible nozzle 30 during the passage of a core 27 causes the fibres to cling uniformaly to the core. FIG. 8 shows a plan view of the plate 29 with the nozzle 30. The shaped section can also be wound in this case to improve the bond between the inlays and glass fibre stands.

Various shapes of core elements are illustrated in FIGS. 9a-f double cone (FIG. 9a), double cone with cylindrical insert (FIG. 9d), prismatic body with pyramid end shapes on both sides (FIGS. 9b, c, f), ellipsoid.

Figure 10A:
FIG. 10a shows the core composed of double cones and connecting wires and FIG. 10b shows the core in section.
Figure 10B:
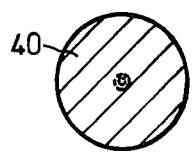
Figure 11A:
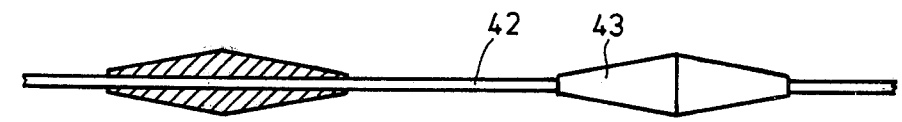
FIG. 11a shows a continuous core with superimposed thickenings and FIG. 11b shows the core in section.
Figure 11B:
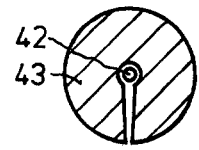
Figure 12:
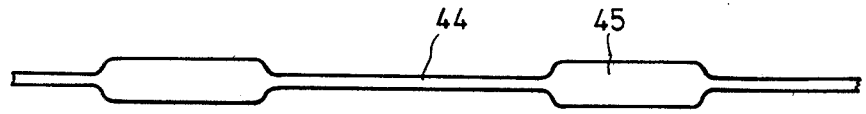
FIG. 12 shows a thermoplastic mono-filament with stretched and unstretched regions.

Discrete elements of the type illustrated in FIG. 9 are introduced individually into the widened region of the thread bundle or they are joined together beforehand. FIGS. 10a and 10b show a continuous core in which bores are present at the ends of the metallic double cone 40 into which connecting pieces are inserted and bonded or pressed or soldered. Thickened regions 43 are pressed onto the wire 42 in FIGS. 11a and 11b. Thermosetting plastics or metals can obviously also be applied by casting, thermoplastics also by spraying. A core like the one in FIG. 11 can also be produced by extrusion. With a continuous core like the one shown in FIG. 12 made of thermoplastic monofilament, the changes in cross-section have been produced by desired stretching of an individual region. Stretched points 44 and unstretched points 45 alternate.

FIGS. 13-15 show a rod produced according to the invention or shown in FIG. 5 wherein a discrete inlay member 50 is embedded in a fiber bundle 46 impregnated with matrix 47. The bundle 46 is pressed against the member 50 by thread 48.

FIGS. 16-18 show a rod produced according to the invention as shown in FIG. 1 wherein the core now comprises members 51 interconnected by members 49.

FIG. 19 shows the use of the rod 52 according to the invention to reinforce a concrete block 53, in which the rod 52 is embedded.

What we claim is:

1. A composite fiber material rod comprising a matrix impregnated fiber bundle with predominantly unidirectional fiber orientation completely embedding a core with the fiber bundle closely pressed to the core, wherein the configuration of the cross-section of the core varies in the fiber direction and the configuration of the cross section of the fiber bundle varies in the fiber direction in conformity with that of the core.

2. The rod according to claim 1, wherein the core comprises at least one discrete member extending only along a portion of the longitudinal length of the fiber bundle.

3. The rod according to claim 1, wherein the core comprises a plurality of members spaced along the rod in the fiber direction and completely embedded in the fiber bundle to effect a plurality of variations in the configuration of the cross section of the fiber bundle.

4. The rod according to claim 1, wherein the core comprises a plurality of members periodically spaced along the rod in the fiber direction and completely embedded in the fiber bundle to effect a periodic variation in the configuration of the cross section of the fiber bundle.

5. The rod according to claim 3 or 4, wherein the plurality of members are interconnected.

6. The rod according to claim 3 or 4, wherein the plurality of members are discrete and each extends along only a portion of the longitudinal length of fiber bundle.

7. The rod according to claim 1, wherein the core comprises a filamentary member having thickened portions periodically spaced in the fiber direction, the filamentary member completely embedded in the fiber bundle to effect a periodic variation in the configuration of the cross section of the fiber bundle.

8. The rod according to claim 1, wherein the core comprises material selected from the group of plastics and metals.

9. The rod according to claim 1, wherein the variation in the cross section of the core is gradual.

10. A prestressed concrete article comprising at least one rod according to claim 1 embedded therein.

* * * * *